US009802470B2

(12) United States Patent
Miyazawa et al.

(10) Patent No.: US 9,802,470 B2
(45) Date of Patent: Oct. 31, 2017

(54) VEHICLE DRIVE DEVICE

(71) Applicant: AISIN AW CO., LTD., Anjo-shi, Aichi-ken (JP)

(72) Inventors: Manabu Miyazawa, Anjo (JP); Tatsuyuki Uechi, Toyoake (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/300,135

(22) PCT Filed: May 28, 2015

(86) PCT No.: PCT/JP2015/065468
§ 371 (c)(1),
(2) Date: Sep. 28, 2016

(87) PCT Pub. No.: WO2015/182722
PCT Pub. Date: Dec. 3, 2015

(65) Prior Publication Data

US 2017/0158042 A1 Jun. 8, 2017

(30) Foreign Application Priority Data

May 28, 2014 (JP) ................................. 2014-110080

(51) Int. Cl.
*B60K 6/40* (2007.10)
*B60K 6/405* (2007.10)
(Continued)

(52) U.S. Cl.
CPC ................ *B60K 6/40* (2013.01); *B60K 6/405* (2013.01); *B60K 6/48* (2013.01); *B60K 6/54* (2013.01);
(Continued)

(58) Field of Classification Search
None
See application file for complete search history.

(56) References Cited

U.S. PATENT DOCUMENTS 6,008,545 A * 12/1999 Nagano .................. B60K 6/485 290/1 C
6,166,498 A 12/2000 Yamaguchi et al.
(Continued)

FOREIGN PATENT DOCUMENTS

JP 2000-217205 A 8/2000
JP 2007-118808 A 5/2007
(Continued)

OTHER PUBLICATIONS

Aug. 18, 2015 Search Report issued in International Patent Application No. PCT/JP2015/065468.

*Primary Examiner* — J. Allen Shriver, II
*Assistant Examiner* — Hilary L Johns
(74) *Attorney, Agent, or Firm* — Oliff PLC

(57) ABSTRACT

A vehicle drive device that includes a wheel drive rotary electric machine and a transmission device on a power transmission path connecting an input member drivingly coupled to an internal combustion engine and an output member drivingly coupled to wheels; a pump electric motor that serves as a driving force source of a hydraulic pump; a case that accommodates the wheel drive rotary electric machine, the transmission device, and the pump electric motor; and a motor controller including a first inverter that controls the wheel drive rotary electric machine, a second inverter that controls the pump electric motor, a cooler that cools the first inverter and the second inverter, and a smoothing capacitor that smooths direct-current power to be supplied to the first inverter and the second inverter.

5 Claims, 6 Drawing Sheets

(51) Int. Cl.

| | |
|---|---|
| ***B60K 6/48*** | (2007.10) |
| ***B60K 6/54*** | (2007.10) |
| ***B60L 9/18*** | (2006.01) |
| ***B60L 11/14*** | (2006.01) |
| ***B60L 1/02*** | (2006.01) |
| ***B60L 15/00*** | (2006.01) |
| ***F16H 61/00*** | (2006.01) |
| ***B60W 20/00*** | (2016.01) |

(52) U.S. Cl.

CPC *B60L 1/02* (2013.01); *B60L 9/18* (2013.01); *B60L 11/14* (2013.01); *B60L 15/007* (2013.01); *B60W 20/00* (2013.01); *F16H 61/0006* (2013.01); *B60L 2240/525* (2013.01); *Y02T 10/645* (2013.01); *Y02T 10/70* (2013.01); *Y02T 10/7077* (2013.01)

(56) References Cited

U.S. PATENT DOCUMENTS

| | | | | |
|---|---|---|---|---|
| 8,021,176 | B2 * | 9/2011 | Sekino | H01R 27/02 439/222 |
| 8,201,650 | B2 | 6/2012 | Yoshida | |
| 8,240,411 | B2 | 8/2012 | Nakatsu et al. | |
| 8,376,069 | B2 | 2/2013 | Nakatsu et al. | |
| 8,482,904 | B2 * | 7/2013 | Darroman | H02M 7/003 361/624 |
| 8,542,467 | B2 * | 9/2013 | Yamaguchi | H02M 7/003 361/18 |
| 8,736,043 | B2 * | 5/2014 | Konno | H01L 29/417 257/693 |
| 8,817,468 | B2 * | 8/2014 | Hirashima | H05K 7/20927 165/104.33 |
| 8,863,869 | B2 | 10/2014 | Nakatsu et al. | |
| 8,878,483 | B2 * | 11/2014 | Darroman | B60L 11/1816 320/107 |
| 9,036,355 | B2 * | 5/2015 | Wavering | H05K 1/0265 361/748 |
| 9,065,317 | B2 * | 6/2015 | Enami | H02K 11/0073 |
| 9,105,596 | B2 * | 8/2015 | Bian | H01L 23/36 |
| 9,106,174 | B2 * | 8/2015 | Sekiya | H02P 3/18 |
| 9,148,255 | B2 * | 9/2015 | Inagaki | H04L 1/06 |
| 9,179,581 | B2 * | 11/2015 | Suwa | H05K 7/20927 |
| 9,192,083 | B2 * | 11/2015 | Moon et al. | H05K 7/20254 |
| 9,214,406 | B2 * | 12/2015 | Yoshimi | H01L 25/0655 |
| 9,241,428 | B1 * | 1/2016 | Doo | H02M 1/10 |
| 9,247,668 | B2 * | 1/2016 | Kusada | H05K 7/1432 |
| 9,247,675 | B2 * | 1/2016 | Higuchi | B60L 11/1803 |
| 9,313,922 | B2 * | 4/2016 | Muller | H05K 7/20318 |
| 9,345,160 | B2 * | 5/2016 | Fukumasu | B60L 11/1816 |
| 9,356,515 | B2 * | 5/2016 | Sicard | H03K 17/687 |
| 9,419,535 | B2 * | 8/2016 | Nishihara | H02M 7/003 |
| 9,420,724 | B2 * | 8/2016 | Pietrantonio | H05K 7/20509 |
| 9,446,657 | B2 * | 9/2016 | Takahashi | B60L 15/007 |
| 9,461,556 | B2 * | 10/2016 | Flett | H02M 5/4585 |
| 9,493,092 | B2 * | 11/2016 | Kondoh | B60L 11/1868 |
| 9,584,038 | B2 * | 2/2017 | Linderman | H05K 7/1432 |
| 9,595,500 | B2 * | 3/2017 | Kouno | H01L 23/4334 |
| 9,642,242 | B2 * | 5/2017 | Ido | H05K 1/0272 |
| 2010/0084206 | A1 | 4/2010 | Yoshida et al. | |
| 2012/0248909 | A1 | 10/2012 | Ito et al. | |
| 2013/0128645 | A1 * | 5/2013 | Nakatsu | B60L 11/00 363/141 |
| 2013/0283972 | A1 * | 10/2013 | Yamamoto | B60K 6/405 74/665 B |
| 2015/0022974 | A1 | 1/2015 | Nakatsu et al. | |

FOREIGN PATENT DOCUMENTS

| | | | |
|---|---|---|---|
| JP | 2008-290621 | A | 12/2008 |
| JP | 2010-063234 | A | 3/2010 |
| JP | 2011-067093 | A | 3/2011 |
| JP | 2012-217263 | A | 11/2012 |
| JP | 2014-024489 | A | 2/2014 |

* cited by examiner

VEHICLE DRIVE DEVICE

BACKGROUND

The present disclosure relates to a vehicle drive device including: a wheel drive rotary electric machine and a transmission device on a power transmission path connecting an input member drivingly coupled to an internal combustion engine and an output member drivingly coupled to wheels; a pump electric motor that serves as a driving force source of a hydraulic pump; and a case that accommodates the wheel drive rotary electric machine, the transmission device, and the pump electric motor.

Techniques described in Japanese Patent Application Publication No. 2011-67093 (JP 2011-67093 A) and Japanese Patent Application Publication No. 2007-118808 (JP 2007-118808 A) are known in connection with the vehicle drive device described above. According to the technique described in JP 2011-67093 A, a first inverter device for a wheel drive rotary electric machine, a second inverter device for a pump electric motor, a cooling unit, and a smoothing capacitor are arranged to overlap as viewed in an up-down direction. According to the technique described in JP 2007-118808 A, a cooling unit and a first inverter device for a wheel drive rotary electric machine are disposed in the upward direction of the wheel drive rotary electric machine, and a smoothing capacitor is disposed in front of the wheel drive rotary electric machine.

However, according to the technique described in JP 2011-67093 A, the overall height of the motor control device is increased. Therefore, with this technique, when the motor control device is attached to a case of a vehicle drive device, the height of the motor control device protruding from the case is increased, which may result in a reduction in mountability to a vehicle. According to the technique described in JP 2007-118808 A, the smoothing capacitor is disposed in front of the vehicle drive device. Therefore, with this technique, the length of the vehicle drive device in the front-rear direction may be increased. Further, with this technique, the efficient utilization of the space in the upward direction of the vehicle drive device may not be achieved. Further, as for this technique, the arrangement of a second inverter device for a pump electric motor is not described, so that an appropriate arrangement including the arrangement of the second inverter device has not been implemented.

SUMMARY

It is therefore desired to implement a vehicle drive device in which a motor control device including a first inverter device for a wheel drive rotary electric machine, a second inverter device for a pump electric motor, and a cooling unit that cools these devices is compactly arranged in the upward direction of a case of the vehicle drive device.

In view of the above, according to one exemplary aspect, a vehicle drive device includes: a wheel drive rotary electric machine and a transmission device on a power transmission path connecting an input member drivingly coupled to an internal combustion engine and an output member drivingly coupled to wheels; a pump electric motor that serves as a driving force source of a hydraulic pump; a case that accommodates the wheel drive rotary electric machine, the transmission device, and the pump electric motor; and a motor control device including a first inverter that controls the wheel drive rotary electric machine, a second inverter that controls the pump electric motor, a cooler that cools the first inverter and the second inverter, and a smoothing capacitor that smooths direct-current power to be supplied to the first inverter and the second inverter; in which a rotational axis of the input member and a rotational axis of the transmission device are aligned in a vehicle width direction; in the motor control device, an inverter unit and the smoothing capacitor are arranged in a vehicle front-rear direction in an upward direction of the case, the inverter unit including the first inverter, the second inverter, and the cooler; and one of the inverter unit and the smoothing capacitor having a smaller thickness in a vehicle up-down direction than the other is disposed in an upward direction of a highest located member, the highest located member being a member located at a highest position in a region of the case overlapping the motor control device as viewed in the vehicle up-down direction.

The term "drivingly coupled" as used herein refers to a state in which two rotary elements are coupled to each other in such a manner that allows transmission of a driving force, including a state in which the two rotary elements are coupled to each other to rotate together, and a state in which the two rotary elements are coupled to each other via one or more transmission members in such a manner that allows transmission of a driving force. Examples of such transmission members include various members that transmit rotation at an equal speed or a changed speed, such as a shaft, a gear mechanism, a belt, and a chain, for example. Examples of such transmission members may include an engagement device that selectively transmits rotation and a driving force, such as a friction engagement device and a meshing type engagement device, for example.

According to the above characteristic configuration, the rotational axis of the input member and the rotational axis of the transmission device are aligned in the vehicle width direction. The vehicle drive device with this arrangement is of a transverse engine type such as a so-called FF type (front-engine, front-wheel-drive type) and an RR type (rear-engine, rear-wheel-drive type), for example. That is, if the vehicle drive device and the internal combustion engine are disposed in the front part of the vehicle, the vehicle drive device and the internal combustion engine are configured to drive the wheels disposed in the front part. If the vehicle drive device and the internal combustion engine are disposed in the rear part of the vehicle, the vehicle drive device and the internal combustion engine are configured to drive the wheels disposed in the rear part. In the case of the transverse engine type, although it is relatively easy to provide a space for installing the motor control device in the upper part of the vehicle drive device, the space in the upward direction of the case is still limited, and therefore it is preferable to suppress an increase in the height of the motor control device protruding with respect to the case.

In order to reduce the protruding height of the motor control device, it is considered that the components of the motor control device are arranged in the vehicle front-rear direction. In this case, in order to cool the first inverter and the second inverter by the cooler, these components are integrated into one unit as an inverter unit, and then the inverter unit and the smoothing capacitor are arranged in the vehicle front-rear direction. Thus, it is possible to suppress an increase in the protruding height of the motor control device.

In the upward direction of the highest located member, the case projects upward, so that the height of the case tends to increase. According to the present configuration, one of the inverter unit and the smoothing capacitor having a smaller thickness in the vehicle up-down direction than the other is disposed in the upward direction of the highest located member. Accordingly, according to the present configuration, it is possible to effectively suppress an increase in the protruding height of the motor control device, and to compactly arrange the motor control device in the upward direction of the case of the vehicle drive device.

DETAILED DESCRIPTION OF EMBODIMENTS

Figure 2:
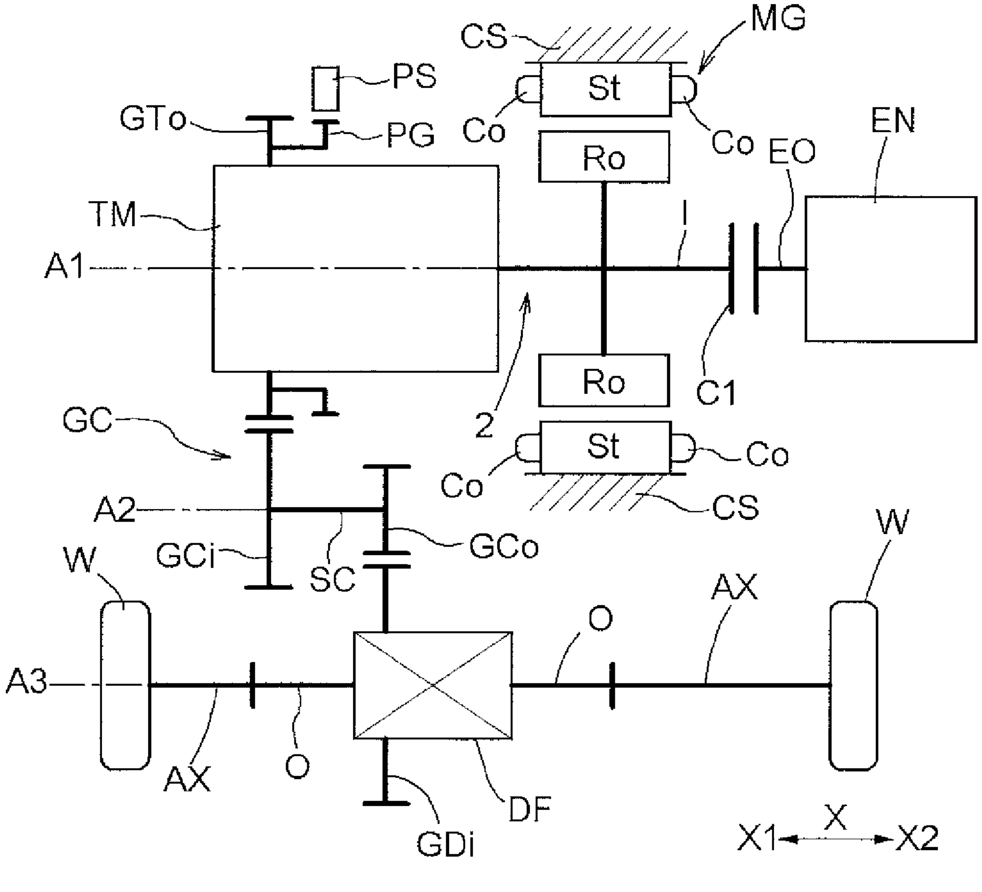
FIG. 2 is a skeleton diagram illustrating a vehicle drive device according to the embodiment.
Figure 4:
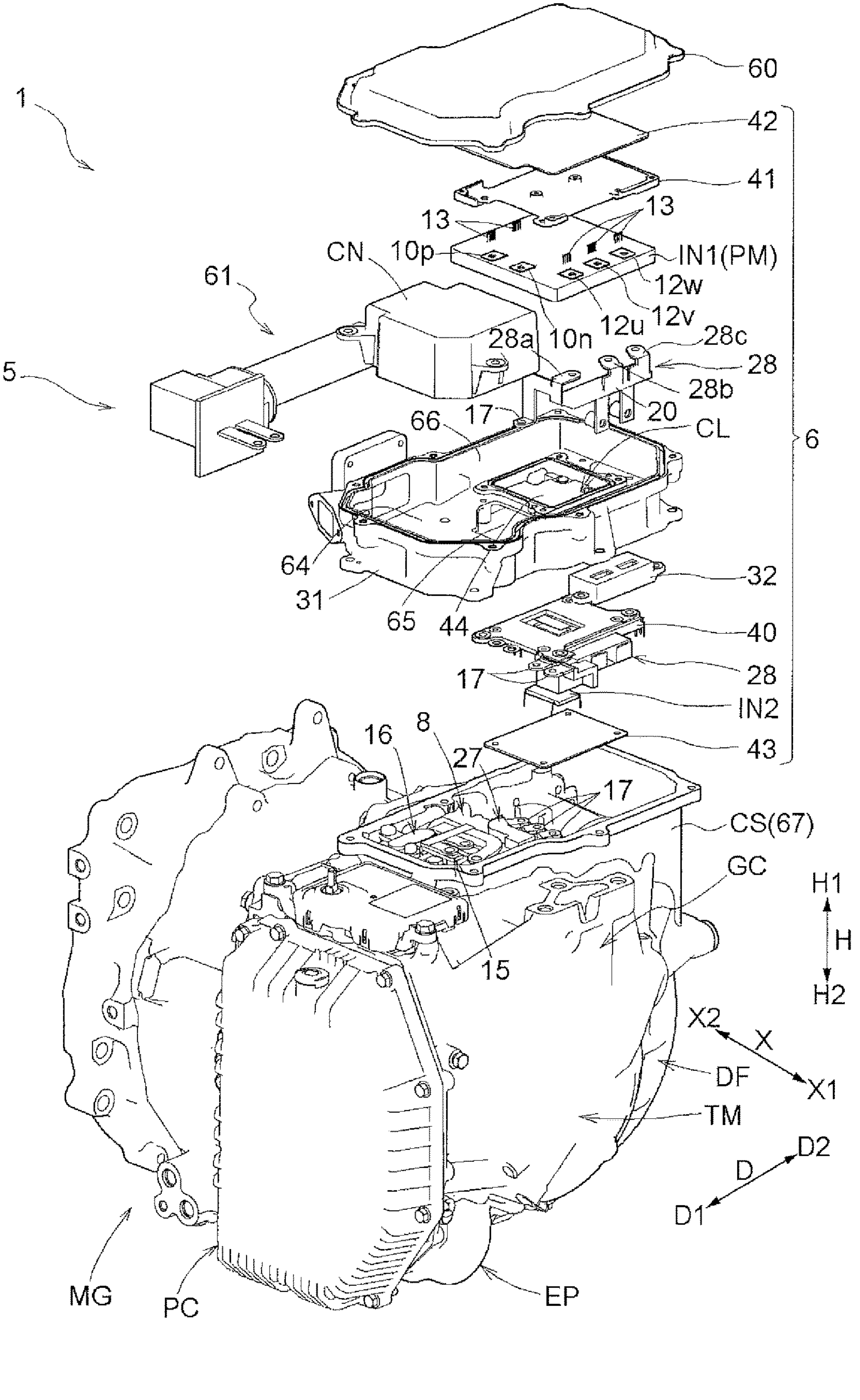
FIG. 4 is an exploded perspective view illustrating the vehicle drive device according to the embodiment.
Figure 5:
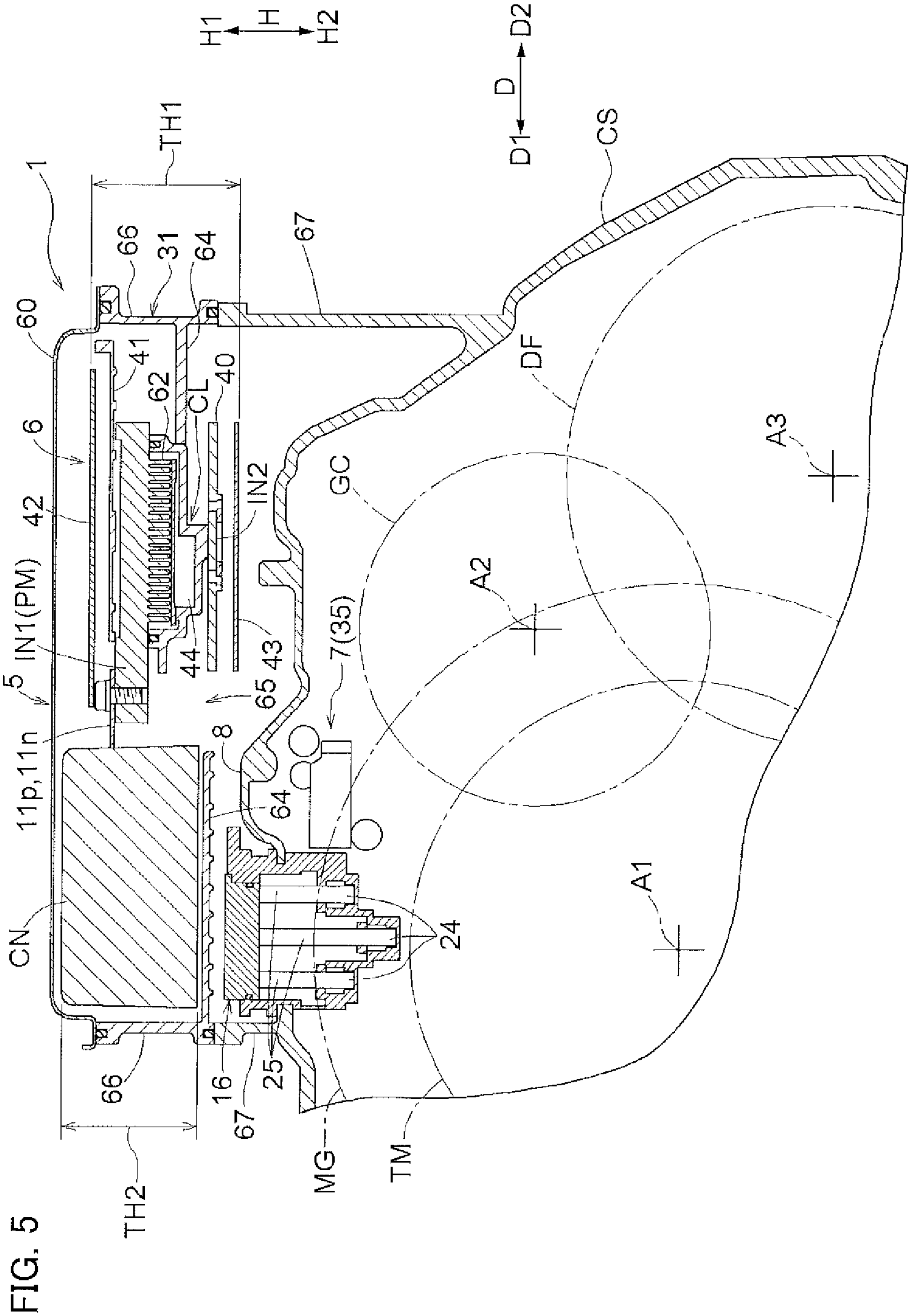
FIG. 5 is a longitudinal sectional view illustrating a main part of the vehicle drive device according to the embodiment.

Hereinafter, an embodiment illustrating a vehicle drive device for a hybrid vehicle including an internal combustion engine and a rotary electric machine as a driving force source of the vehicle will be described with reference to the drawings. As illustrated in FIG. 2, a vehicle drive device 1 includes a wheel drive rotary electric machine MG and a transmission device TM on a power transmission path 2 connecting an input shaft I drivingly coupled to an internal combustion engine EN and output shafts O drivingly coupled to the wheels W. Also, as illustrated in FIGS. 4 and 5, the vehicle drive device 1 includes a pump electric motor EP that serves as a driving force source of a hydraulic pump, and a case CS that accommodates the wheel drive rotary electric machine MG, the transmission device TM, and the pump electric motor EP. Note that the input shaft I corresponds to an “input member”, and the output shafts O correspond to an “output member”.

As illustrated in FIG. 5, the vehicle drive device 1 includes a motor control device 5 including a first inverter device IN1 (i.e., first inverter) that controls the wheel drive rotary electric machine MG, a second inverter device IN2 (i.e., second inverter) that controls the pump electric motor EP, a cooling unit CL (i.e., cooler) that cools the first inverter device IN1 and the second inverter device IN2, and a smoothing capacitor CN that smooths direct-current power to be supplied to the first inverter device IN1 and the second inverter device IN2.

As illustrated in FIG. 2, a rotational axis of the input shaft I and a rotational axis of the transmission device TM are aligned in a vehicle width direction X. As illustrated in FIG. 5, in the motor control device 5, an inverter unit 6, which includes the first inverter device IN1, the second inverter device IN2, and the cooling unit CL, and the smoothing capacitor CN are arranged in a vehicle front-rear direction D in the upward direction H1 of the case CS. Further, one of the inverter unit 6 and the smoothing capacitor CN having a smaller thickness in a vehicle up-down direction H than the other is disposed in the upward direction H1 of a highest located member 7 that is a member located at the highest position in a region of the case CS overlapping the motor control device 5 as viewed in the vehicle up-down direction H.

Note that the vehicle up-down direction H corresponds to a vertical up-down direction when the vehicle on which the vehicle drive device 1 is mounted is disposed on a horizontal plane. Further, “front” and “forward” or “rear” and “rearward” refer to the “front” or “rear” in the vehicle front-rear direction D. Further, “right” and “rightward” or “left” and “leftward” refer to the “right” or “left” of a vehicle 3 in the vehicle width direction X. In the following, the vehicle drive device 1 according to the present disclosure will be described in detail.

Figure 1:
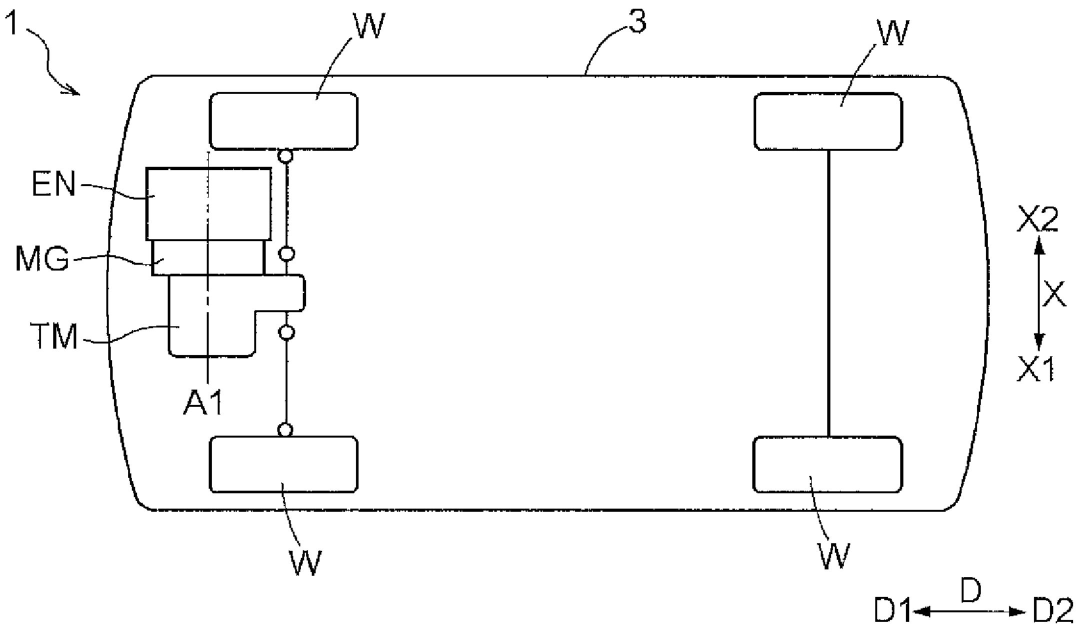
FIG. 1 is a diagram illustrating a schematic configuration of a vehicle according to an embodiment.

1. Schematic Configuration of Vehicle Drive Device 1 and Internal Combustion Engine EN As illustrated in FIGS. 1 and 2, a hybrid vehicle includes the internal combustion engine EN and the wheel drive rotary electric machine MG as the driving force source of the vehicle 3. The vehicle drive device 1 includes the wheel drive rotary electric machine MG and the transmission device TM on the power transmission path 2 connecting the input shaft I drivingly coupled to the internal combustion engine EN and the output shafts O drivingly coupled to the wheels W.

In the present embodiment, the wheel drive rotary electric machine MG and the transmission device TM are provided on the power transmission path 2 connecting the input shaft I and the output shafts O, in this order from the input shaft I side. Further, the rotational axis of the input shaft I, the rotational axis of the wheel drive rotary electric machine MG, and the rotational axis of the transmission device TM are coaxially aligned with a first axis A1. The vehicle drive device 1 includes a counter gear mechanism GC between the transmission device TM and the output shafts O on the power transmission path 2. Further, the vehicle drive device 1 includes a differential gear mechanism DF between the counter gear mechanism GC and the wheels W on the power transmission path 2. The output shafts O are output shafts of the differential gear mechanism DF coupled to axles AX. The axles AX are coupled to the respective wheels W disposed on the right and left.

The rotational axis of the counter gear mechanism GC is aligned with a second axis A2 parallel to the first axis A1 and different from the first axis A1. Further, the rotational axis of the output shafts O (differential gear mechanism DF) is aligned with a third axis A3 parallel to the first axis A1 and different from the first axis A1 and the second axis A2.

<Internal Combustion Engine EN>

The internal combustion engine EN is a heat engine driven by combustion of fuel. The internal combustion engine EN may be any known type of internal combustion engine such as, for example, gasoline engine and diesel engine. In this example, an internal combustion engine output shaft EO, such as a crankshaft, of the internal combustion engine EN is drivingly coupled to the input shaft I. The internal combustion engine output shaft EO of the internal combustion engine EN is aligned with the first axis A1 that is coaxial with the input shaft I. In the present embodiment, the internal combustion engine output shaft EO and the input shaft I are connected via a clutch C1.

<Case CS>

As illustrated in FIGS. 4 and 5, the wheel drive rotary electric machine MG, the transmission device TM, and the pump electric motor EP included in the vehicle drive device 1 are accommodated in the case CS. The case CS includes an outer wall that is formed to cover the outer sides of the wheel drive rotary electric machine MG, the transmission device TM, and the pump electric motor EP. Further, in order to support or isolate each of the wheel drive rotary electric machine MG, the transmission device TM, and the pump electric motor EP, the case CS includes a partition wall that partially or fully covers these components.

<Wheel Drive Rotary Electric Machine MG>

As illustrated in FIG. 2, the wheel drive rotary electric machine MG includes a stator St fixed to the case CS, and a rotor Ro rotatably supported radially inward of the stator St. In the present embodiment, the wheel drive rotary electric machine MG is disposed between the internal combustion engine EN and the transmission device TM on the first axis A1, and the rotor Ro is drivingly coupled to the input shaft I to rotate therewith.

Figure 3:
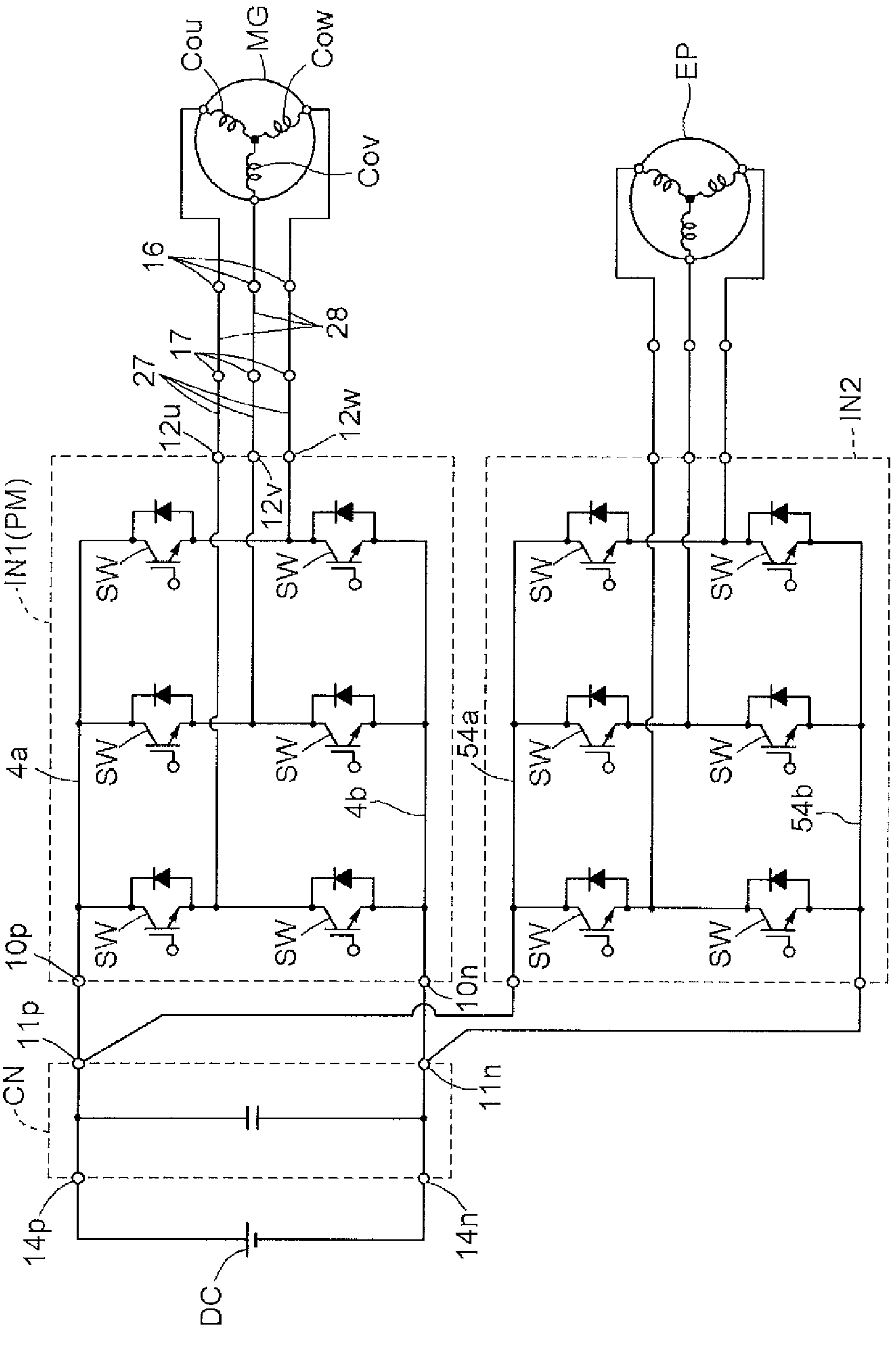
FIG. 3 is a circuit diagram illustrating a motor control device according to the embodiment.

As illustrated in FIG. 3, the wheel drive rotary electric machine MG is electrically connected to a direct-current power supply DC including an electric storage device, via the first inverter device IN1 that performs DC-AC conversion. Further, the wheel drive rotary electric machine MG can serve as a motor (electric motor) that is supplied with electricity to generate power, and as a generator (electric generator) that is supplied with power to generate electricity. That is, the wheel drive rotary electric machine MG is supplied with electricity from the direct-current power supply DC via the first inverter device IN1 to perform power running, or generate electricity using a rotational driving force transmitted from the internal combustion engine EN and the wheels W. The generated electricity is stored in the direct-current power supply DC (electric storage device) via the first inverter device IN1.

<Transmission Device TM>

The transmission device TM is a power transmission device that changes the speed of rotation of the input shaft I and transmits the rotation to a shift output gear GTo. In the present embodiment, the transmission device TM is a stepped automatic transmission device that provides a plurality of shift speeds with different speed ratios. In order to establish the plurality of shift speeds, the transmission device TM includes a gear mechanism such as a planetary gear mechanism and an engagement device such as a friction engagement device. The transmission device TM changes the rotational speed of the input shaft I by switching between the speed ratios of the respective shift speeds, converts the torque of the input shaft I, and transmits the torque to the shift output gear GTo. The torque transmitted from the transmission device TM to the shift output gear GTo is distributed and transmitted to the two right and left axles AX via the counter gear mechanism GC and the differential gear mechanism DF, and then transmitted to the wheels W drivingly coupled to the respective axles AX.

<Counter Gear Mechanism GC>

As illustrated in FIG. 2, the counter gear mechanism GC is a power transmission device that transmits a driving force of the shift output gear GTo to a differential input gear GDi of the differential gear mechanism DF. The shift output gear GTo and the differential input gear GDi mesh with counter gears of the counter gear mechanism GC at different circumferential positions on the counter gear mechanism GC. The rotational axis of the counter gear mechanism GC is aligned with the second axis A2. In the present embodiment, the counter gear mechanism GC includes, as counter gears, a counter input gear GCi and a counter output gear GCo with a smaller diameter than that of the counter input gear GCi. The counter input gear GCi and the counter output gear GCo are coupled by a counter shaft SC to rotate together about the rotational axis of the counter gear mechanism GC. The counter input gear GCi meshes with the shift output gear GTo. Further, the counter output gear GCo meshes with the differential input gear GDi at a different circumferential position from the shift output gear GTo.

<Differential Gear Mechanism DF>

The differential gear mechanism DF includes the differential input gear GDi, and distributes and transmits the driving force transmitted to the differential input gear GDi to the plurality of wheels W. In this example, the differential gear mechanism DF is a differential gear mechanism using a plurality of bevel gears meshing with each other, and distributes and transmits the torque transmitted to the differential input gear GDi to the two right and left output shafts O. The output shafts O are coupled to the axles AX, and the axles AX are coupled to the two right and left wheels W. The differential gear mechanism DF including the differential input gear GDi and the output shafts O are aligned with the third axis A3.

<Hydraulic Control Device PC>

A hydraulic control device PC (see FIG. 4) is a device that controls a hydraulic pressure to be supplied to the components of the vehicle drive device 1. The hydraulic control device PC includes a plurality of hydraulic control valves such as a linear solenoid valve. The hydraulic control device PC regulates the hydraulic pressure of the oil discharged by a hydraulic pump to required levels, and supplies the regulated hydraulic pressure to the components of the vehicle drive device 1 such as the engagement device of the transmission device TM. In the present embodiment, the hydraulic pump includes two types of hydraulic pumps: a mechanical hydraulic pump and an electric hydraulic pump. The mechanical hydraulic pump is driven by the rotational driving forces of the internal combustion engine EN and the wheel drive rotary electric machine MG. The electric hydraulic pump is driven by the rotational driving force of the pump electric motor EP. In the present embodiment, as illustrated in FIG. 4, the pump electric motor EP is disposed in the downward direction H2 of the transmission device TM in the case CS. As illustrated in FIG. 3, the pump electric motor EP is electrically connected to the direct-current power supply DC including the electric storage device, via the second inverter device IN2 that performs DC-AC conversion. Further, the pump electric motor EP has a function of a motor (electric motor) that is supplied with electricity to generate power.

2. Motor Control Device 5

The vehicle drive device 1 includes the motor control device 5 that controls the wheel drive rotary electric machine MG and the pump electric motor EP. The motor control device 5 includes the first inverter device IN1 that controls the wheel drive rotary electric machine MG, the second inverter device IN2 that controls the pump electric motor EP, the cooling unit that cools the first inverter device IN1 and the second inverter device IN2, and the smoothing capacitor CN that smooths direct-current power to be supplied to the first inverter device IN1 and the second inverter device IN2. Further, the motor control device 5 includes a first inverter control device 42 that controls the first inverter device IN1, and a second inverter control device 43 that controls the second inverter device IN2.

<First Inverter Device IN1>

The first inverter device IN1 controls the wheel drive rotary electric machine MG. The first inverter device IN1 is a DC-AC conversion device that converts direct-current power for the direct-current power supply DC and alternating-current power for the wheel drive rotary electric machine MG. In the present embodiment, as illustrated in FIG. 3, the first inverter device IN1 is configured to convert direct-current power supplied from the direct-current power supply DC such as an electric storage device into three-phase alternating power and supply the alternating-current power to three-phase coils Cou, Coy, and Cow of the wheel drive rotary electric machine MG, and to convert alternating-current power generated (regenerated) by the wheel drive rotary electric machine MG into direct-current power and supply the direct-current power to the direct-current power supply DC.

The first inverter device IN1 includes a plurality of switching elements SW. The switching elements SW may be power semiconductor elements such as IGBTs (insulated gate bipolar transistors). The first inverter device IN1 is configured as a bridge circuit that includes, for coils of a plurality of phases, namely, the coils Cou, Coy, and Cow of respective three phases (U-phase, V-phase, and W-phase), three series circuits each including two series-connected switching elements SW. More specifically, series circuits each including two series-connected switching elements SW are formed between a positive-side wire 4*a* and a negative-side wire 4*b* in the first inverter device IN1. The first inverter device IN1 for three phases includes total of six switching elements SW. Intermediate wires, each of which connecting two switching elements SW in the series circuit of the corresponding phase, are connected to the coils Cou, Coy, and Cow of the respective phases. A freewheeling diode is connected in parallel to each switching element SW.

<First Inverter Control Device 42>

The first inverter control device 42 controls ON and OFF of the plurality of switching elements SW of the first inverter device IN1. The first inverter control device 42 includes a drive circuit that drives the plurality of switching elements SW. The drive circuit is connected to a gate terminal of each switching element SW. The first inverter control device 42 includes a drive control device that calculates the ON/OFF timing of each switching element SW based on a vector control method or the like, using an arithmetic processing unit or the like, and transmits an ON command or an OFF command to the drive circuit. The circuit components of the first inverter control device 42 are mounted on a substrate. Note that in the drawings, only the substrate is illustrated, and the circuit components are not illustrated.

<Second Inverter Device IN2>

The second inverter device IN2 controls the pump electric motor EP. The second inverter device IN2 is a DC-AC conversion device that converts direct-current power for the direct-current power supply DC and alternating-current power for the pump electric motor EP. The second inverter device IN2 includes a plurality of switching elements SW. The switching elements SW may be transistors such as FETs (field effect transistors). Similar to the first inverter device IN1, the second inverter device IN2 includes, for coils of respective three phases, three series circuits each including two series-connected switching elements SW, between a positive-side wire 54*a* and a negative-side wire 54*b* in the second inverter device IN2. Intermediate wires are connected to the coils of the respective phases, and each of the intermediate wires connects two switching elements SW in the series circuit of the corresponding phase.

<Second Inverter Control Device 43>

Similar to the first inverter control device 42, the second inverter control device 43 controls ON and OFF of the plurality of switching elements SW of the second inverter device IN2. The second inverter control device 43 includes a drive circuit that drives the plurality of switching elements SW. The drive circuit is connected to a gate terminal of each switching element SW. The circuit components of the second inverter control device 43 are mounted on a substrate. Note that in the drawings, only the substrate is illustrated, and the circuit components are not illustrated.

<Smoothing Capacitor CN>

The smoothing capacitor CN smooths direct-current power supplied to the first inverter device IN1 and the second inverter device IN2. The smoothing capacitor CN is connected between the positive-side wire 4*a* and the negative-side wire 4*b* in the first inverter device IN1, and between the positive-side wire 54*a* and the negative-side wire 54*b* in the second inverter device IN2, and smooths a direct-current voltage (system voltage) between the positive-side wires 4*a* and 54*a* and the negative-side wires 4*b* and 54*b* in the first inverter device IN1 and the second inverter device IN2. The smoothing capacitor CN is arranged in parallel between: the first inverter device IN1 and the second inverter device IN2 including the switching elements SW; and the direct-current power supply DC.

<Power Module PM>

In the present embodiment, as illustrated in FIGS. 3 and 4, the first inverter device IN1 is a power module PM formed as one component in which the plurality of switching elements SW are integrated into one module, and is formed in a rectangular flat plate. The power module PM includes a positive connection terminal 10*p* for connecting the positive-side wire 4*a* to the positive sides of the direct-current power supply DC and the smoothing capacitor CN, and a negative connection terminal 10*n* for connecting the negative-side wire 4*b* to the negative sides of the direct-current power supply DC and the smoothing capacitor CN. Further, the power module PM includes three coil connection terminals 12*u*, 12*v*, and 12*w* for connecting the intermediate wires of the series circuits of the respective phases to the coils Cou, Coy, and Cow of the respective three phases. Further, the power module PM includes six element connection terminals 13 for connecting the gate terminals of the respective switching elements SW to the drive circuit of the first inverter control device 42. Each element connection terminal 13 includes a connection terminal for outputting information from a sensor that detects an electric current flowing through each switching element SW and a temperature to the first inverter control device 42.

The smoothing capacitor CN is formed into a module as one component, and is formed in a cuboid shape. The smoothing capacitor CN includes a positive element connection terminal 11*p* for connecting a positive terminal of the smoothing capacitor CN to the positive connection terminal 10*p* of the power module PM, and a negative element connection terminal 11*n* for connecting a negative terminal of the smoothing capacitor CN to the negative connection terminal 10*n* of the power module PM (see FIGS. 5 and 6). Further, the smoothing capacitor CN includes a positive power supply connection terminal 14*p* for connecting the positive terminal of the smoothing capacitor CN to a positive terminal of the direct-current power supply DC, and a negative power supply connection terminal 14*n* for connecting the negative terminal of the smoothing capacitor CN to a negative terminal of the direct-current power supply DC (see FIG. 6). The positive power supply connection terminal 14$p$ and the negative power supply connection terminal 14$n$ are connected to the direct-current power supply DC via a power supply connection line 61.

<Arrangement>

As illustrated in FIGS. 1 and 2, in the vehicle drive device 1, the rotational axis of the input shaft I and the rotational axis of the transmission device TM are aligned in the vehicle width direction X. In the present embodiment, the vehicle drive device 1 is a so-called FF type (front-engine, front-wheel-drive type). That is, the vehicle drive device 1 and the internal combustion engine EN are disposed in a front part D1 of the vehicle and configured to drive the wheels W disposed in the front part D1, and the vehicle drive device 1 is of a so-called transversely mounted type. Note that in the case of a so-called FR type (front-engine, rear-wheel-drive type), the rotational axis of the input shaft I and the rotational axis of the transmission device TM are aligned in the vehicle front-rear direction D. In the case of the FR type, the transmission device TM is usually disposed in a floor tunnel formed such that the floor of the vehicle projects in the upward direction H1, and therefore it is difficult to provide a space for installing the motor control device 5 in the upper part H1 of the vehicle drive device 1. On the other hand, in the case of the FF type, the transmission device TM is disposed in the engine compartment of the vehicle, and therefore it is relatively easy to provide a space for installing the motor control device 5 in the upper part H1 of the vehicle drive device 1.

In the present embodiment, as illustrated in FIG. 5, the motor control device 5 is disposed in the upward direction H1 of the case CS. However, since the space in the upward direction H1 of the case CS is still limited, it is preferable to reduce the height of the motor control device 5. In the present embodiment, in the motor control device 5, the inverter unit 6, which includes the first inverter device IN1, the second inverter device IN2, and the cooling unit CL, and the smoothing capacitor CN are arranged in the vehicle front-rear direction D in the upward direction H1 of the case CS. Further, one of the inverter unit 6 and the smoothing capacitor CN having a smaller thickness in the vehicle up-down direction H than the other is disposed in the upward direction H1 of the highest located member 7 that is a member located at the highest position in a region of the case CS overlapping the motor control device 5 as viewed in the vehicle up-down direction H. With this configuration, an increase in the height of the motor control device 5 is suppressed.

The protruding height of the motor control device 5 protruding in the upward direction H1 of the case CS can be reduced by arranging the components of the motor control device 5 in the vehicle front-rear direction D. In this case, in the present embodiment, in order to efficiently cool the first inverter device IN1 and the second inverter device IN2 by the cooling unit CL, these components are integrated into one unit as the inverter unit 6, and the inverter unit 6 and the smoothing capacitor CN are arranged in the vehicle front-rear direction D. A projecting portion 8 formed such that an outer surface of the case CS projects in the upward direction H1 is formed in the upward direction H1 of the highest located member 7. The projecting portion 8 forms a portion having the greatest height in a region of the case CS overlapping either the inverter unit 6 or the smoothing capacitor CN (hereinafter referred to as a region where the motor control device 5 is arranged) as viewed in the vehicle up-down direction H.

In the present embodiment, a thickness TH2 of the smoothing capacitor CN in the vehicle up-down direction H is smaller than a thickness TH1 of the inverter unit 6 in the vehicle up-down direction H. Accordingly, the smoothing capacitor CN having a smaller thickness is disposed in the upward direction H1 of the projecting portion 8, and the inverter unit 6 having a greater thickness is disposed in the region excluding the region located in the upward direction H1 of the projecting portion 8. Since the smoothing capacitor CN having a smaller thickness is disposed in the upward direction H1 of the highest located member 7 and the inverter unit 6 having a greater thickness is disposed in the region excluding the region located in the upward direction H1 of the highest located member 7, it is possible to reduce the protruding height of the motor control device 5 and to reduce the overall size of the vehicle drive device 1. Note that although the thickness TH1 of the inverter unit 6 is a thickness between the upper surface of the substrate of the first inverter control device 42 and the lower surface of the substrate of the second inverter control device 43 in FIG. 5, the thickness that is actually required is greater than the thickness illustrated in FIG. 5 in view of the circuit components mounted on the substrate and the allowance distance (such as insulation distance) between the circuit components and the wall.

In the present embodiment, the highest located member 7 is a portion that constitutes a parking lock mechanism PR. The parking lock mechanism PR meshes with a parking gear PG coupled to a rotary member that rotates together with the wheels W, and controls the rotation of the wheels W. In the present embodiment, as illustrated in FIG. 2, the parking gear PG is coupled to the shift output gear GTo to rotate therewith. An engagement member PS is configured to be swingable about a swing fulcrum fixed to the case CS, and is configured to switch between a meshing state of meshing with the parking gear PG by swinging and a non-meshing state. The engagement member PS is swung by a cam mechanism 35 such as a parking rod, within a predetermined range of movement. A support portion of the cam mechanism 35 is fixed to the case CS. In the present embodiment, the highest located member 7 is a portion that constitutes the cam mechanism 35 (the cam mechanism itself, a support member thereof, or the like) of the parking lock mechanism PR.

<Control Device Case 31>

In the present embodiment, the motor control device 5 is accommodated in a control device case 31, and the control device case 31 is attached to the case CS. As illustrated in FIGS. 4 and 5, the control device case 31 includes a peripheral wall 66 surrounding the periphery of the motor control device 5, and a bottom wall 64 provided to close an opening of the peripheral wall 66 in the downward direction H2. The case CS includes a support wall 67 protruding in the upward direction H1 to match the shape of the peripheral wall 66. The lower end portion of the peripheral wall 66 is in contact with and fixed to the upper end portion of the support wall 67. A lid 60 that closes the opening of the peripheral wall 66 in the upward direction H1 is fixed to the upper end portion of the peripheral wall 66.

In the present embodiment, the smoothing capacitor CN is disposed on the upper side of the bottom wall 64 of the control device case 31, and is fixed to the bottom wall 64. Further, as will be described below, the cooling unit CL is formed on the bottom wall 64 of the control device case 31. The first inverter device IN1 is disposed on the upper side of the bottom wall 64 on which the cooling unit CL is formed, and is fixed to the bottom wall 64. The second inverter device IN2 is disposed in the downward direction of the bottom wall 64 on which the cooling unit CL is formed, and is fixed to the bottom wall 64.

In the present embodiment, as illustrated in FIG. 2, the rotational axis of the input shaft I, the rotational axis of the wheel drive rotary electric machine MG, and the rotational axis of the transmission device TM are aligned with the first axis A1. The rotational axis of the counter gear mechanism GC is aligned with the second axis A2 parallel to the first axis A1 and different from the first axis A1. The rotational axis of the output shafts O is aligned with the third axis A3 parallel to the first axis A1 and different from the first axis A1 and the second axis A2. As illustrated in FIG. 5, the second axis A2 and the third axis A3 are disposed on one side (in this example, the rearward direction D2) in the vehicle longitudinal direction D with respect to the first axis A1, and the second axis A2 is disposed in the upward direction H1 with respect to the third axis A3. The third axis A3 is disposed on one side (in this example, the rearward direction D2) in the vehicle front-rear direction D with respect to the second axis A2.

Figure 6:
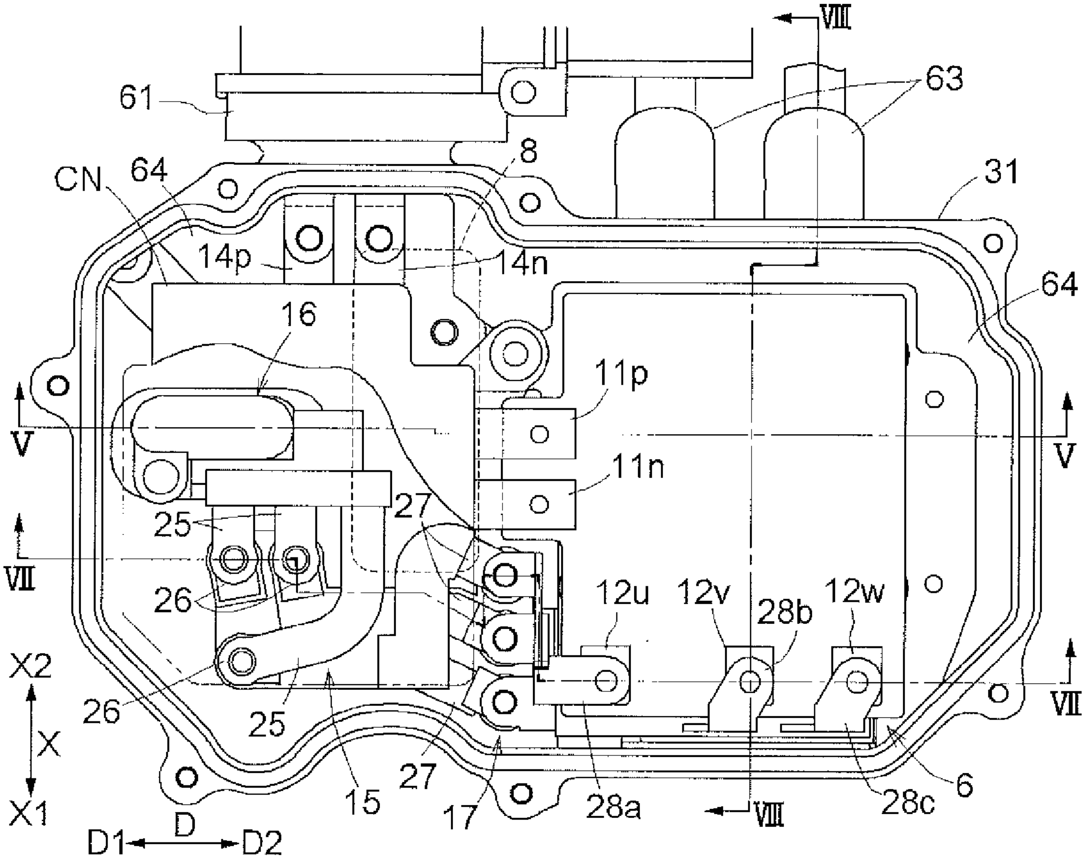
FIG. 6 is a plan view illustrating a main part of the vehicle drive device according to the embodiment.

The motor control device 5 is disposed in a position overlapping the first axis A1, the second axis A2, and the third axis A3, as viewed in the vehicle up-down direction H. Since the first axis A1, the second axis A2, and the third axis A3 are arranged in the vehicle front-rear direction D, the case CS is elongated in the vehicle front-rear direction D as illustrated in FIGS. 4 to 6. Thus, the region where the motor control device 5 is arranged is elongated in the vehicle front-rear direction D and in the upward direction H1 of the case CS, in accordance with the shape of the case CS that is elongated in the vehicle front-rear direction D. In the present embodiment, the region where the motor control device 5 is arranged has a rectangular shape elongated in the vehicle front-rear direction D as viewed in the vehicle up-down direction H.

As illustrated in FIG. 5, the region on one side in which the motor control device 5 is arranged (in this example, the region where the front portion of the motor control device 5 is located) overlaps the first axis A1 as viewed in the vehicle up-down direction H, and the region on the other side in which the motor control device 5 is arranged (in this example, the region where the rear portion of the motor control device 5 is located) overlaps the second axis A2 and the third axis A3 as viewed in the vehicle up-down direction H. Accordingly, the front portion of the motor control device 5 is located mainly in the upward direction H1 of the transmission device TM, and the rear portion of the motor control device 5 is located mainly in the upward direction H1 of the counter gear mechanism GC and the output shafts O (differential gear mechanism DF).

In the present embodiment, as described above, the highest located member 7 is a portion that constitutes the parking lock mechanism PR that locks the parking gear PG provided in the transmission device TM, and is disposed in the upward direction H1 of the transmission device TM. More specifically, the highest located member 7 is disposed in a region in the rearward direction D2 of the rotational axis (first axis A1) of the transmission device TM, and in the forward direction D1 of the rotational axis (second axis A2) of the counter gear mechanism GC, as viewed in the vehicle up-down direction H. The region in the upward direction H1 of the highest located member 7 and the projecting portion 8 is a front portion of the region where the motor control device 5 is arranged. The smoothing capacitor CN having a smaller thickness is disposed in the front portion of the region where the motor control device 5 is arranged, and the inverter unit 6 having a greater thickness is disposed in the rear portion of the region where the motor control device 5 is arranged.

<Through Connection Terminal 16>

The vehicle drive device 1 includes a connection conductor that electrically connects a coil Co of the wheel drive rotary electric machine MG and the first inverter device IN1. In the present embodiment, as illustrated in FIG. 3, the wheel drive rotary electric machine MG includes the coils Cou, Coy, and Cow of the three phases, and three sets of connection conductors (27, 28).

The vehicle drive device 1 includes a through connection terminal 16 that is a relay connection terminal disposed on an electrical connection path electrically connecting the coil Co of the wheel drive rotary electric machine MG and the first inverter device IN1 and that extends through the case CS.

As illustrated in FIG. 5, the through connection terminal 16 is disposed in the downward direction H2 of the inverter unit 6 or the smoothing capacitor CN. In the present embodiment, the through connection terminal 16 is disposed in the downward direction H2 of one of the inverter unit 6 and the smoothing capacitor CN having a smaller thickness in the vehicle up-down direction H than the other. In other words, one of the inverter unit 6 and the smoothing capacitor CN having a smaller thickness in the vehicle up-down direction H than the other is disposed in the upward direction H1 of the through connection terminal 16. The through connection terminal 16 extends through the case CS, and therefore protrudes in the upward direction H1 with respect to a portion of the case CS around the area through which the through connection terminal 16 extends. In the present embodiment, the through connection terminal 16 protrudes in the upward direction H1 to a height equivalent to the height of the projecting portion 8 (in this example, slightly greater than the height of the projecting portion 8).

In the present embodiment, the smoothing capacitor CN having a smaller thickness is disposed in the upward direction H1 of the through connection terminal 16. The through connection terminal 16 is located at a position corresponding to a front portion of the region where the smoothing capacitor CN is arranged. The projecting portion 8 (highest located member 7) is located in a position corresponding to a rear portion of the region where the smoothing capacitor CN is arranged. The through connection terminal 16 and the projecting portion 8 are arranged adjacent to each other in the vehicle front-rear direction D. Further, a through portion of the through connection terminal 16 running through the case and the projecting portion 8 are arranged not to overlap each other as viewed in the vehicle up-down direction H.

The through connection terminal 16 is disposed in the upward direction H1 of the transmission device TM. A coil conductor extending in the space inside the case CS from the coil Co of the wheel drive rotary electric machine MG, which is coaxially aligned with the transmission device TM, toward the transmission device TM in the axial direction (vehicle width direction X) is connected to terminals 24 inside the case CS of the through connection terminal 16. As illustrated in FIGS. 5 and 6, conductors 25 of the through connection terminal 16 extend in the upward direction H1 from the terminals 24 inside the case CS to terminals 26 outside the case CS through the case CS. More specifically, the conductors 25 of the through connection terminal 16 extend through the case CS, and then extend to the left side X1 in the vehicle width direction X, and the terminals 26 outside the case CS are disposed at a left portion of the region where the smoothing capacitor CN is arranged. Note that, one of the conductors 25 in the rearward direction D2 partially passes through the region in the upward direction H1 of the projecting portion 8 to extend in the leftward direction X1.

Figure 7:
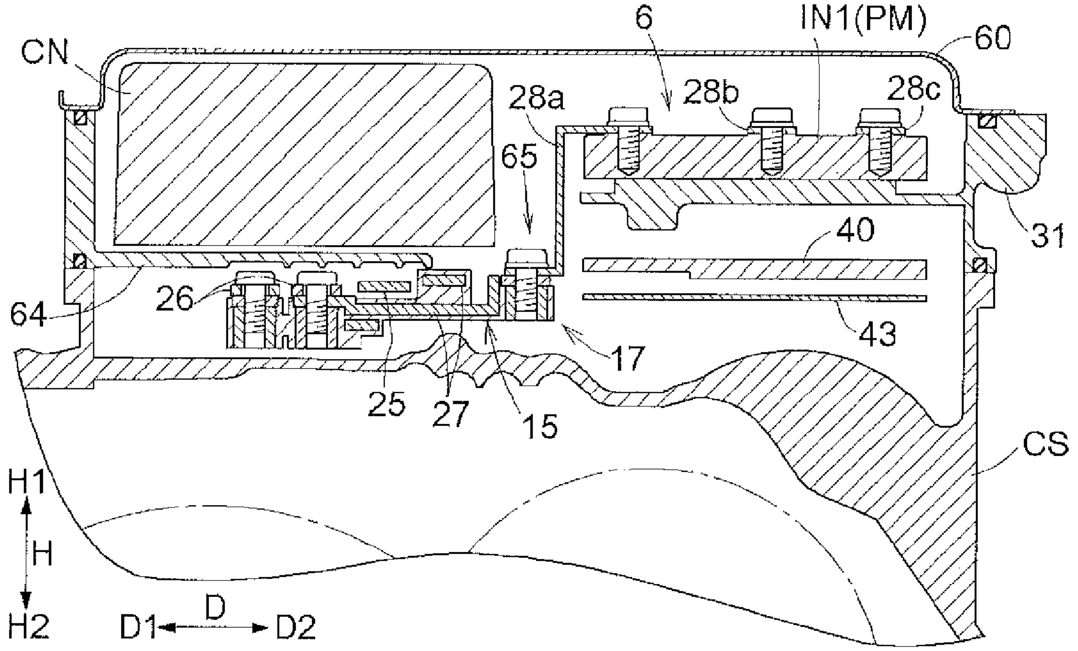
FIG. 7 is a longitudinal sectional view illustrating a main part of the vehicle drive device according to the embodiment.

As illustrated in FIGS. 6 and 7, the connection conductors 27 connecting the through connection terminal 16 and the first inverter device IN1 side extend from the terminals 26 of the through connection terminal 16 outside the case CS, through the space in the downward direction H2 of the smoothing capacitor CN (bottom wall 64) (space between the smoothing capacitor CN (bottom wall 64) and the case CS), to the first inverter device IN1 side. In FIG. 6, the smoothing capacitor CN and the bottom wall 64 of the control device case 31, which will be described below, are partially cut away for ease of understanding of the arrangement of connection lines. The connection conductors 27 extend in the rearward direction D2 from the terminals 26 of the through connection terminal 16 outside the case CS while avoiding the projecting portion 8 (so as not to overlap the projecting portion 8 as viewed in the vehicle up-down direction H). More specifically, as indicated by the broken lines in FIG. 6, the projecting portion 8 is arranged in the rightward direction X2 in the rear part D2 of the region where the smoothing capacitor CN is arranged, and is not arranged in the left end portion in the rear part D2 of the region where the smoothing capacitor CN is arranged. Accordingly, as illustrated in the longitudinal section in FIG. 7, the distance between the smoothing capacitor CN (bottom wall 64) and the case CS is increased in a region of the left end portion where the projecting portion 8 is not located. Thus, the connection conductors 27 extend in the rearward direction D2 from the terminals 26 of the through connection terminal 16 outside the case CS to the intermediate connection terminal 17, which will be described below.

In the present embodiment, the plurality of connection conductors 27 electrically connecting the through connection terminal 16 and the intermediate connection terminal 17 are bus bars. A first bus bar group 15 including the plurality of bus bars has a portion disposed in the downward direction H2 of the smoothing capacitor CN as described above. The first bus bar group 15 is a module integrated by a case member made of resin or the like.

<Intermediate Connection Terminal 17>

In the present embodiment, the vehicle drive device 1 includes an intermediate connection terminal 17 that is a relay connection terminal disposed on an electrical connection path connecting the through connection terminal 16 and the first inverter device IN1. As illustrated in FIGS. 6 and 7, the intermediate connection terminal 17 is disposed between the first inverter device IN1 and the smoothing capacitor CN, in a region not overlapping both of the first inverter device IN1 and the smoothing capacitor CN, as viewed in the vehicle up-down direction H. According to this configuration, the intermediate connection terminal 17 can be fastened by a bolt or the like from the upward direction H1, without obstruction by the first inverter device IN1 and the smoothing capacitor CN.

In the present embodiment, the intermediate connection terminal 17 is a terminal that connects the connection conductors 27 extending from the through connection terminal 16 side and the connection conductors 28 extending from the first inverter device IN1 side. More specifically, terminals of the intermediate connection terminal 17 on one side are provided on the end portions of the connection conductors 27 extending from the through connection terminal 16 side, and terminals of the intermediate connection terminal 17 on the other side are provided on the end portions of the connection conductors 28 extending from the first inverter device IN1 side. The terminals are connected to each other by bolts or the like.

Figure 8:
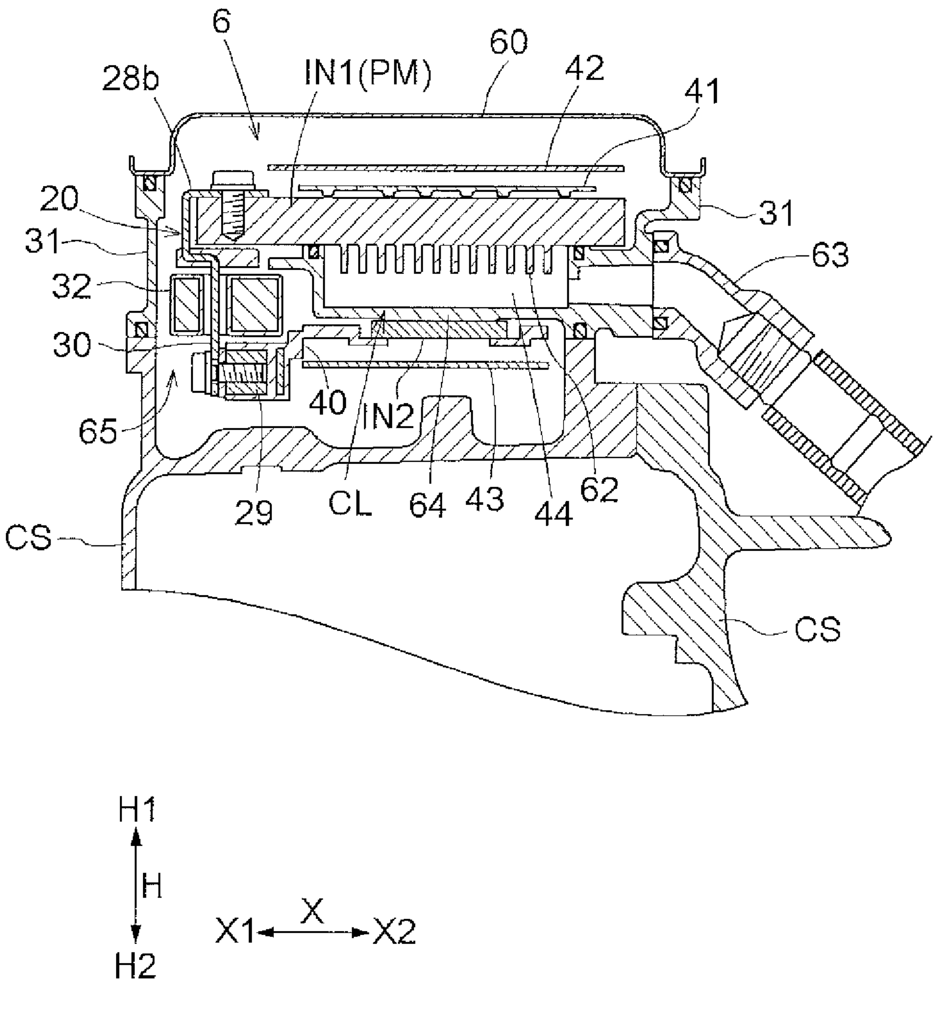
FIG. 8 is a transverse sectional view illustrating a main part of the vehicle drive device according to the embodiment.

The connection conductors 28 extend in the upward direction H1 from the intermediate connection terminal 17 to the terminal of the first inverter device IN1. In the present embodiment, as illustrated in the longitudinal section in FIG. 7, a first connection conductor 28*a* extends in the upward direction H1 in a region between the inverter unit 6 and the smoothing capacitor CN. The first connection conductor 28*a* extends in the upward direction H1 through an opening 65 formed in the bottom wall 64 of the control device case 31. As illustrated in the transverse section in FIG. 8, second and third connection conductors 28*b* and 28*c* extend in the upward direction H1 in a region on the left side X1 of the inverter unit 6. Note that the second and third connection conductors 28*b* and 28*c* include an intermediate extending portion 29 extending from the intermediate connection terminal 17 to the region on the left side X1 of the inverter unit 6, and an up-down extending portion 30 extending in the upward direction H1 in the region on the left side X1 of the inverter unit 6. The intermediate extending portion 29 is disposed inside the second bracket 40 holding the second inverter device IN2. As illustrated in FIG. 8, an end portion of the intermediate extending portion 29 and an end portion of the up-down extending portion 30 are fastened by a bolt. The up-down extending portion 30 extends through the opening 65 formed in the bottom wall 64 of the control device case 31, and a sensor hole of a current sensor 32 disposed in the downward direction H2 of the first inverter device IN1, in the vehicle up-down direction H. In this manner, the three connection conductors 28 extend in the vehicle up-down direction H on the side of the inverter unit 6, and have a portion overlapping the inverter unit 6 as viewed in the horizontal direction.

The plurality of connection conductors 28 electrically connecting the intermediate connection terminal 17 and the first inverter device IN1 are bus bars. A second bus bar group 20 including the plurality of bus bars has a portion overlapping the inverter unit 6 as viewed in the horizontal direction as described above. The second bus bar group 20 is a module integrated by a case member made of resin or the like. In the present embodiment, as illustrated in FIG. 4, the first connection conductor 28*a* and the up-down extending portion 30 of the second and third connection conductors 28*b* and 28*c* are integrated into a module. The intermediate extending portion 29 of the second and third connection conductors 28*b* and 28*c* is housed in the second bracket 40 and formed as a module.

<Cooling Unit CL>

As illustrated in FIG. 5, the cooling unit CL is interposed between the first inverter device IN1 and the second inverter device IN2 from the both sides in the vehicle up-down direction H. In the present embodiment, the first inverter device IN1 is disposed in the upward direction H1 of the cooling unit CL, and the second inverter device IN2 is disposed in the downward direction H2 of the cooling unit CL. The first inverter control device 42 is disposed in the upward direction H1 of the first inverter device IN1 with a first bracket 41 interposed therebetween. The second inverter control device 43 is disposed in the downward direction H2 of the second inverter device IN2. A second bracket 40 that supports the second inverter device IN2 and other components is disposed around the second inverter device IN2. The second bracket 40 and the second inverter device IN2 are disposed between the cooling unit CL and the second inverter control device 43.

As illustrated in FIG. 5, the cooling unit CL includes a cooling water channel 44 supplied with cooling water for cooling the first inverter device IN1 and the second inverter device IN2. The cooling water is cooled by a radiator or the like, and is supplied to the cooling water channel 44 via a water supply and drainage channel 63 by a water pump. As illustrated in FIGS. 6 and 8, the water supply and drainage channel 63 is disposed in the rightward direction X2 of the cooling unit CL, and includes two water channels: a water supply channel, and a water drainage channel. The cooling water channel 44 is formed by a recessed portion having a rectangular shape in a plan view and opens in the upward direction H1, and the recessed portion is formed in the bottom wall 64 of the control device case 31. The opening of the recessed portion is closed with a lower surface of the first inverter device IN1 (power module PM) so as to be a closed water channel in a cuboid shape. A cooling fin 62 to be disposed in the cooling water channel 44 is attached to the lower surface of the first inverter device IN1 (power module PM). The upper surface of the second inverter device IN2 is in contact with the lower surface of the bottom wall 64 of the control device case 31 defining the lower surface of the cooling water channel 44.

OTHER EMBODIMENTS

Hereinafter, other embodiments will be described. The configuration described in each of the following embodiments is not limited to be applied in an individual manner, or may be applied in combination with the configuration described in any other embodiment as long as no inconsistency arises.

(1) In the example described above, the smoothing capacitor CN has a smaller thickness in the vehicle up-down direction H than the inverter unit 6, and the smoothing capacitor CN having a smaller thickness is disposed in the upward direction H1 of the highest located member 7. However, embodiments of the vehicle drive device 1 are not limited thereto. That is, the inverter unit 6 may have a smaller thickness in the vehicle up-down direction H than the smoothing capacitor CN, and the inverter unit 6 having a smaller thickness may be disposed in the upward direction H1 of the highest located member 7.

(2) In the example described above, the highest located member 7 is disposed in a front portion of the region where the motor control device 5 is arranged as viewed in the vehicle up-down direction H. However, embodiments of the vehicle drive device 1 are not limited thereto. That is, the highest located member 7 may be disposed in a rear portion of the region where the motor control device 5 is arranged as viewed in the vehicle up-down direction H.

(3) In the example described above, the motor control device 5 is disposed in the upward direction H1 of the transmission device TM and so on. However, embodiments of the vehicle drive device 1 are not limited thereto. That is, the motor control device 5 may be disposed in the upward direction H1 of another component such as the wheel drive rotary electric machine MG and so on, as long as the motor control device 5 is disposed in the upward direction H1 of the case CS.

(4) In the example described above, the cooling unit CL is interposed between the first inverter device IN1 and the second inverter device IN2 from the both sides in the vehicle up-down direction H. However, embodiments of the vehicle drive device 1 are not limited thereto. That is, both the first inverter device IN1 and the second inverter device IN2 may be disposed in the upward direction H1 or in the downward direction H2 of the cooling unit CL.

(5) In the example described above, the through connection terminal 16 is disposed in the downward direction H2 of the smoothing capacitor CN having a smaller thickness. However, embodiments of the vehicle drive device 1 are not limited thereto. That is, the through connection terminal 16 may be disposed in the downward direction H2 of the inverter unit 6 having a greater thickness, or may be disposed in the downward direction H2 of both of the smoothing capacitor CN and the inverter unit 6. Alternatively, the through connection terminal 16 may be disposed not to overlap both of the inverter unit 6 and the smoothing capacitor CN as viewed in the vehicle up-down direction H. Further, in accordance with this arrangement, the arrangement configuration of a connection line connecting the through connection terminal 16 and the first inverter device IN1 may be changed.

(6) In the example described above, the rotational axis of the input shaft I, the rotational axis of the wheel drive rotary electric machine MG, and the rotational axis of the transmission device TM are aligned with the first axis A1. However, embodiments of the vehicle drive device 1 are not limited thereto. That is, at least the rotational axis of the input shaft I and the rotational axis of the transmission device TM need to be aligned in the vehicle width direction X, and the rotational axis of the input shaft I, the rotational axis of the wheel drive rotary electric machine MG, and the rotational axis of the transmission device TM may be disposed on different axes. For example, the wheel drive rotary electric machine MG may be disposed on an axis different from the first axis A1, and thus an output gear of the wheel drive rotary electric machine MG may mesh with the counter input gear GCi of the counter gear mechanism GC at a different circumferential position from the shift output gear GTo. Alternatively, if the transmission device TM includes a plurality of mutually parallel rotary shafts as in the case of a dual-clutch transmission or a belt-type continuously variable transmission device, one of the plurality of rotary shafts of the transmission device TM may be coaxially aligned with one or both of the rotational axis of the input shaft I and the rotational axis of the wheel drive rotary electric machine MG.

3. Summary of Embodiments

As described above, the vehicle drive device 1 preferably has at least the following configuration. A vehicle drive device (1) includes: a wheel drive rotary electric machine (MG) and a transmission device (TM) on a power transmission path (2) connecting an input member (I) drivingly coupled to an internal combustion engine (EN) and an output member (O) drivingly coupled to wheels (W); a pump electric motor (EP) that serves as a driving force source of a hydraulic pump; and a case (CS) that accommodates the wheel drive rotary electric machine (MG), the transmission device (TM), and the pump electric motor (EP); the vehicle drive device (1) including: a motor control device (5) including a first inverter device (IN1) that controls the wheel drive rotary electric machine (MG), a second inverter device (IN2) that controls the pump electric motor (EP), a cooling unit (CL) that cools the first inverter device (IN1) and the second inverter device (IN2), and a smoothing capacitor (CN) that smooths direct-current power to be supplied to the first inverter device (IN1) and the second inverter device (IN2). A rotational axis of the input member (I) and a rotational axis of the transmission device (TM) are aligned in a vehicle width direction (X). In the motor control device (5), an inverter unit (6) and the smoothing capacitor (CN) are arranged in a vehicle front-rear direction (D) in the upward direction (H1) of the case (CS), the inverter unit (6) including the first inverter device (IN1), the second inverter device (IN2), and the cooling unit (CL). One of the inverter unit (6) and the smoothing capacitor (CN) having a smaller thickness in a vehicle up-down direction (H) than the other is disposed in the upward direction (H1) of a highest located member (7), the highest located member (7) being a member located at a highest position in a region of the case (CS) overlapping the motor control device (5) as viewed in the vehicle up-down direction (H).

According to this configuration, the rotational axis of the input member (I) and the rotational axis of the transmission device (TM) are aligned in the vehicle width direction (X). The vehicle drive device (1) with this arrangement is of a transverse engine type such as a so-called FF type (front-engine, front-wheel-drive type) and an RR type (rear-engine, rear-wheel-drive type), for example. The vehicle drive device (1) and the internal combustion engine (EN) are disposed in a front part (D1) or a rear part (D2) of a vehicle (3) and configured to drive wheels (W) disposed in the front part (D1) or the rear part (D2) of the vehicle. In the case of the transverse engine type, although it is relatively easy to provide a space for installing the motor control device (5) in the upper part (H1) of the vehicle drive device (1), the space in the upward direction (H1) of the case (CS) is still limited, and therefore it is preferable to suppress an increase in the protruding height of the motor control device (5).

In order to reduce the protruding height of the motor control device (5), it is considered that the components of the motor control device (5) are arranged in the vehicle front-rear direction (D). In this case, in order to cool the first inverter device (INTO and the second inverter device (IN2) by the cooling unit (CL), these components are integrated into one unit as an inverter unit (6), and then the inverter unit (6) and the smoothing capacitor (CN) are arranged in the vehicle front-rear direction (D). Thus, it is possible to suppress an increase in the protruding height of the motor control device (5).

In the upward direction (H1) of the highest located member (7), the case (CS) projects in the upward direction (H1), so that the height of the case (CS) tends to increase. Since one of the inverter unit (6) and the smoothing capacitor (CN) having a smaller thickness in the vehicle up-down direction (H) than the other is disposed in the upward direction (H1) of the highest located member (7), it is possible to effectively suppress an increase in the protruding height of the motor control device (5), and to compactly arrange the motor control device (5) in the upward direction (H1) of the case (CS) of the vehicle drive device (1).

Further, in the vehicle drive device 1, it is preferable that the cooling unit (CL) is interposed between the first inverter device (IN1) and the second inverter device (IN2) from both sides in the vehicle up-down direction (H).

According to this configuration, it is possible to effectively cool the first inverter device (IN1) and the second inverter device (IN2) by the cooling unit (CL), and to form the inverter unit (6) as an integral unit.

Further, it is preferable that the vehicle drive device 1 further includes a through connection terminal (16) that is a relay connection terminal disposed on an electrical connection path electrically connecting a coil (Co) of the wheel drive rotary electric machine (MG) and the first inverter device (IN1) and that extends through the case (CS), and an intermediate connection terminal (17) that is a relay connection terminal disposed on an electrical connection path connecting the through connection terminal (16) and the first inverter device (IN1), in which the through connection terminal (16) is disposed in the downward direction (H2) of the inverter unit (6) or the smoothing capacitor (CN), and the intermediate connection terminal (17) is disposed between the first inverter device (IN1) and the smoothing capacitor (CN), in a region not overlapping both of the first inverter device (IN1) and the smoothing capacitor (CN), as viewed in the vehicle up-down direction (H).

According to this configuration, since the through connection terminal (16) is disposed in the downward direction (H2) of the motor control device (5), it is easy to establish an electrical connection between the coil (Co) of the wheel drive rotary electric machine (MG) and the first inverter device (IN1). Further, it is possible to connect the intermediate connection terminal (17) from the upward direction (H1), without obstruction by the first inverter device (IN1) and the smoothing capacitor (CN).

Further, it is preferable that the vehicle drive device 1 further includes: a first bus bar group (15) including a plurality of bus bars electrically connecting the through connection terminal (16) and the intermediate connection terminal (17), and a second bus bar group (20) including a plurality of bus bars electrically connecting the intermediate connection terminal (17) and the first inverter device (IN1); in which the first bus bar group (15) has a portion disposed in the downward direction (H2) of the smoothing capacitor (CN); and the second bus bar group (20) has a portion overlapping the inverter unit (6) as viewed in the horizontal direction.

According to this configuration, the first bus bar group (15) extending from the through connection terminal (16) disposed in the downward direction (H2) of the motor control device (5) can be made to extend using the space in the downward direction (H2) of the smoothing capacitor (CN). Further, the second bus bar group (20) can be made to extend in the upward direction H1 from the intermediate connection terminal (17), to which the first bus bar group (15) is connected, on the side of the inverter unit (6) so as to be connected to the first inverter device (IN1). Accordingly, the through connection terminal (16) and the first inverter device (IN1) can be connected with bus bars, while effectively using the space around the motor control device (5).

In the vehicle drive device 1, it is preferable that the rotational axis of the input member (I), a rotational axis of the wheel drive rotary electric machine (MG), and the rotational axis of the transmission device (TM) are coaxially aligned.

According to this configuration, in the vehicle drive device (1) in which the rotational axis of the input member (I), the rotational axis of the wheel drive rotary electric machine (MG), and the rotational axis of the transmission device (TM) are coaxially aligned, it is possible to compactly arrange the motor control device (5) in the upward direction (H1) of the case (CS) of the vehicle drive device (1) as described above.

It is preferable that the vehicle drive device 1 further includes a counter gear mechanism (GC) disposed between the transmission device (TM) and the output member (O) on the power transmission path (2); in which the rotational axis of the input member (I), the rotational axis of the wheel drive rotary electric machine (MG), and the rotational axis of the transmission device (TM) are aligned with a first axis (A1);

a rotational axis of the counter gear mechanism (GC) is aligned with a second axis (A2) parallel to the first axis (A1) and different from the first axis (A1);

a rotational axis of the output member (0) is aligned with a third axis (A3) parallel to the first axis (A1) and different from the first axis (A1) and the second axis (A2);

the second axis (A2) and the third axis (A3) are disposed on one side in the vehicle front-rear direction (D) with respect to the first axis (A1), and the second axis (A2) is disposed in the upward direction (H1) with respect to the third axis (A3); and the motor control device (5) is disposed in a position overlapping the first axis (A1), the second axis (A2), and the third axis (A3), as viewed in the vehicle up-down direction (H).

According to this configuration, since the first axis (A1), the second axis (A2), and the third axis (A3) are arranged in the vehicle front-rear direction (D), the case (CS) is relatively elongated in the vehicle front-rear direction (D). Thus, the region where the motor control device (5) is arranged can be elongated in the vehicle front-rear direction (D) in the upward direction (H1) of the case (CS), in accordance with the shape of the case (CS) that is elongated in the vehicle front-rear direction (D). Accordingly, it is easy to appropriately arrange the inverter unit (6) and the smoothing capacitor (CN) in the vehicle front-rear direction (D) as described above.

INDUSTRIAL APPLICABILITY

The present disclosure may be suitably applied to a vehicle drive device including: a wheel drive rotary electric machine and a transmission device on a power transmission path connecting an input member drivingly coupled to an internal combustion engine and an output member drivingly coupled to wheels; a pump electric motor that serves as a driving force source of a hydraulic pump; and a case that accommodates the wheel drive rotary electric machine, the transmission device, and the pump electric motor.

The invention claimed is:

1. A vehicle drive device comprising:

a wheel drive rotary electric machine and a transmission device on a power transmission path connecting an input member drivingly coupled to an internal combustion engine and an output member drivingly coupled to wheels;

a pump electric motor that serves as a driving force source of a hydraulic pump;

a case that accommodates the wheel drive rotary electric machine, the transmission device, and the pump electric motor;

a motor controller including a first inverter that controls the wheel drive rotary electric machine, a second inverter that controls the pump electric motor, a cooler that cools the first inverter and the second inverter, and a smoothing capacitor that smooths direct-current power to be supplied to the first inverter and the second inverter, wherein a rotational axis of the input member and a rotational axis of the transmission device are aligned in a vehicle width direction;

in the motor controller, an inverter unit and the smoothing capacitor are arranged in a vehicle front-rear direction in an upward direction of the case, the inverter unit including the first inverter, the second inverter, and the cooler; and one of the inverter unit and the smoothing capacitor having a smaller thickness in a vehicle up-down direction than the other is disposed in an upward direction of a highest located member, the highest located member being a member located at a highest position in a region of the case overlapping the motor controller as viewed in the vehicle up-down direction; and a through connection terminal that is a relay connection terminal disposed on an electrical connection path electrically connecting a coil of the wheel drive rotary electric machine and the first inverter and that extends through the case, and an intermediate connection terminal that is a relay connection terminal disposed on an electrical connection path connecting the through connection terminal and the first inverter; wherein the through connection terminal is disposed in a downward direction of the inverter unit or the smoothing capacitor; and the intermediate connection terminal is disposed between the first inverter and the smoothing capacitor, in a region not overlapping both of the first inverter and the smoothing capacitor, as viewed in the vehicle up-down direction.

2. The vehicle drive device according to claim 1, wherein the cooler is interposed between the first inverter and the second inverter in the vehicle up-down direction.

3. The vehicle drive device according to claim 1, further comprising:

a first bus bar group including a plurality of bus bars electrically connecting the through connection terminal and the intermediate connection terminal, and a second bus bar group including a plurality of bus bars electrically connecting the intermediate connection terminal and the first inverter; wherein the first bus bar group has a portion disposed in a downward direction of the smoothing capacitor; and the second bus bar group has a portion overlapping the inverter unit as viewed in the horizontal direction.

4. The vehicle drive device according to claim 1, wherein the rotational axis of the input member, a rotational axis of the wheel drive rotary electric machine, and the rotational axis of the transmission device are coaxially aligned.

5. The vehicle drive device according to claim 1, further comprising:

a counter gear mechanism disposed between the transmission device and the output member on the power transmission path; wherein the rotational axis of the input member, a rotational axis of the wheel drive rotary electric machine, and the rotational axis of the transmission device are aligned with a first axis;

a rotational axis of the counter gear mechanism is aligned with a second axis parallel to the first axis and different from the first axis;

a rotational axis of the output member is aligned with a third axis parallel to the first axis and different from the first axis and the second axis;

the second axis and the third axis are disposed on one side in the vehicle front-rear direction with respect to the first axis, and the second axis is disposed in an upward direction with respect to the third axis; and the motor controller is disposed in a position overlapping the first axis, the second axis, and the third axis, as viewed in the vehicle up-down direction.

* * * * *